July 21, 1936.  W. K. HAWKS  2,048,003

AUTOMATIC LUBRICATING SYSTEM

Filed Aug. 22, 1932   3 Sheets-Sheet 1

INVENTOR

William K. Hawks

BY

ATTORNEYS

July 21, 1936.  W. K. HAWKS  2,048,003

AUTOMATIC LUBRICATING SYSTEM

Filed Aug. 22, 1932   3 Sheets-Sheet 2

INVENTOR
*William K. Hawks*

BY

ATTORNEYS

INVENTOR
William K. Hawks
BY
ATTORNEYS

Patented July 21, 1936

2,048,003

UNITED STATES PATENT OFFICE 2,048,003

AUTOMATIC LUBRICATING SYSTEM

William K. Hawks, Cleveland, Ohio, assignor, by mesne assignments, to The Farval Corporation, Cleveland, Ohio, a corporation of Ohio Application August 22, 1932, Serial No. 629,768

18 Claims. (Cl. 184—7)

The present invention pertains to a novel lubricating system which is operated electrically and controlled automatically in starting and stopping. The principal object is to provide such a system which may be operated regularly at equal intervals and requires the minimum of supervision and attention.

The system is designed particularly for use in connection with the so-called dual line valves wherein lubricant under pressure is delivered to the valves first through one line and then through another line. The fluid under pressure is delivered to the lines from a single source such as a pump and is directed alternately to the respective lines by means of a suitable valve.

In the system constituting this invention, the valve is operated by a motor which in turn is started at regular intervals by means of a time switch. The grease pump is also actuated by a motor in another circuit which however contains a normally open relay. Switches for closing this relay are associated with the valve motor and are closed selectively when the valve motor has adjusted the valve to a new open position. The pump thus supplies lubricant under pressure to the lubricant lines at this time.

The same switches are also incorporated in the valve motor circuit in such a manner as to open this circuit and stop the valve motor when the valve reaches its new adjustment. Thus, the valve motor and pump motor do not operate simultaneously but successively. The system also embodies automatic means for stopping the pump motor when the bearings have been lubricated. This means consists of a control valve which operates to throw a switch and open the pump motor relay after a predetermined pressure has been built up in the lines. This predetermined pressure is at least equal to the lubricant pressure necessary for lubricating the tightest bearing in the lines, so that the control device is not operated and the grease pump motor is not stopped until this bearing has been lubricated.

The invention is fully disclosed by way of example in the following description and in the accompanying drawings, in which—

Reference to these views will now be made by use of like characters which are employed to designate corresponding parts throughout.

Figure 1:
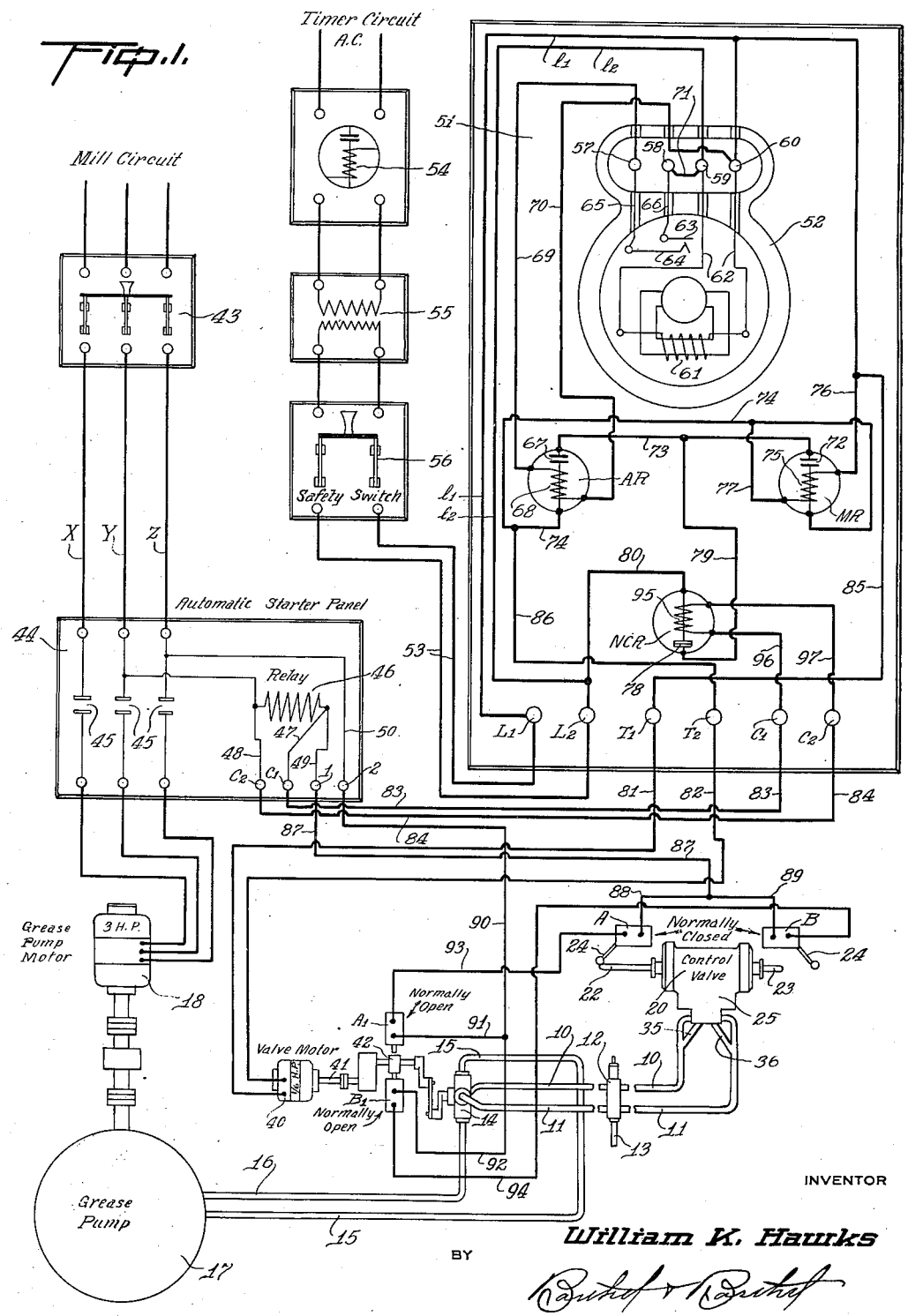
Figure 1 is a wiring diagram of the system.

The system as a whole is an improvement and simplification of the automatic system disclosed in the co-pending application of Hawks and Jennings, Serial No. 506,602, filed January 5, 1931.

The mechanical parts of the system will first be described, and then the wiring will be considered. The numerals 10 and 11 indicate two lines adapted to supply lubricant to a series of measuring valves 12 which are connected as at 13 to bearings or other parts to be lubricated. These valves are of the dual line type, requiring pressure in lines 10 and 11 alternately for their operation, and may be of the single acting type as disclosed in the co-pending application of Kerns, Serial No. 341,958, filed February 23, 1929, issued May 29, 1934 as Patent No. 1,961,051 or of the double acting type as disclosed in the application of Jennings, Serial No. 462,765, filed June 21, 1930, issued Oct. 8, 1935 as Patent No. 2,016,372.

The lines 10 and 11 lead from a four-way valve for alternately supplying lubricant under pressure to the lines, and this valve comprises a cylinder 14 to which two other lines 15 and 16 are connected, alternating with the lines 10 and 11. The lines 15 and 16 extend respectively from the high pressure and low pressure sides of a grease pump 17 which in turn is driven by an electric motor 18 of approximately three horsepower. In other words, the line 15 is adapted to supply lubricant under pressure to the valve casing 14, while the line 16 is a return passage to the reservoir or low pressure side of the pump. The cylinder 14 contains a valve plug 14' which is so recessed as to connect the pressure line 15 with one or the other of the lines 10 and 11, while at the same time connecting the other line 10 or 11 to the return line 16. Thus, by adjustment of the valve plug through the means presently to be descibed, the fluid under pressure delivered by the line 15 may be transferred to either line 10 or 11, while the remaining line 10 or 11 is relieved through its communication with the return line 16.

Both lines 10 and 11 terminate in a control valve comprising a cylinder 20 in which is slidably mounted a piston 21. Rods 22 and 23 extend from the piston through the ends of the cylinder 20 and are adapted respectively to open the normally closed limit switches A and B at the ends of the cylinder 20, by engaging the movable elements 24 thereof. A portion of the wall of the member 20 is enlarged to provide a chambered member 25 in which is formed a passage 26, and the ends of the lines 10 and 11 are connected to the ends of this passage. Two ducts 27 and 28 are drilled from the ends of this passage to the ends of the chamber within the cyplinder 20. The chamber 26 contains a rod 29 having end heads 30 and 31 and an intermediate head 32.

The enlargement 25 is further formed with a pair of passages 33 and 34, between the ducts 27 and 28, connected respectively to the lines 10 and 11 by bypasses 35 and 36 respectively. At each of the passages 33 and 34 is formed a housing 37 for a spring 38, and upon each spring is mounted a valve pin 39 adapted to cover the joint between the corresponding passage 33 or 34 and the associated bypass 35 or 36. The head 32 is so positioned that it always lies between the passages 33 and 34 to prevent direct communication therebetween.

Figure 2:
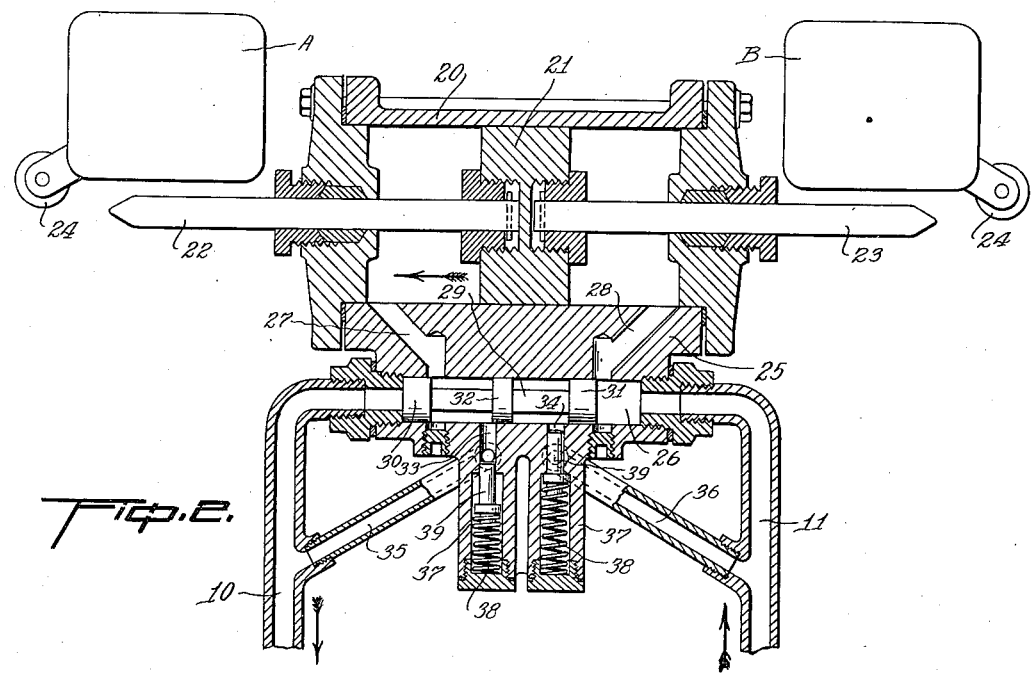
Fig. 2 is a longitudinal section of the control valve unit.
Figures 3, 4:
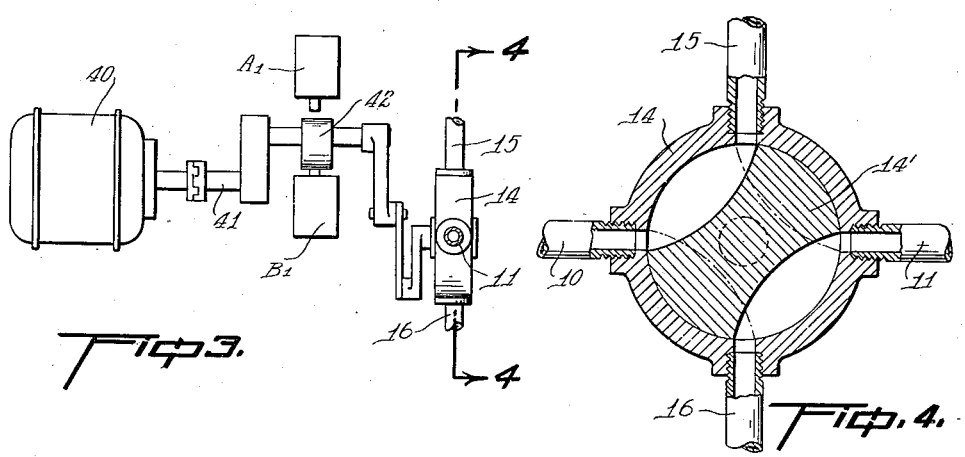
Fig. 3 is a detail elevation of the four-way valve operating mechanism.
Fig. 4 is an enlarged section on the line 4—4 of Figure 3.

When there is pressure in the line 11, the valve rod 29 is moved to the left in Figure 2, thereby opening the duct 28 to the portion of the passage 26 which is supplied with lubricant from line 11 and closing the duct 27 to the line 10. The pressure in the cylinder 20 tends to move the piston 21 to the left but this movement cannot take place until the pressure is sufficient to cause the valve pin 39 to move and uncover the joint between the passages 33 and 35 against the action of the corresponding spring 38, since this joint lies in the only means of communication from the duct 27 to the line 10, which is now the low-pressure relief line. The reverse operation by pressure in the line 10 moves the valve rod 29 to its extreme right position, and a sufficient pressure in the line 10 ultimately causes the corresponding valve pin to uncover the joint between the passage 34 and bypass 36. It is desired that the control valve, which governs the operation of the system, shall not operate until a predetermined pressure has been developed therein, this pressure being at least equivalent of the resistance of the bearings to the introduction of lubricant therein. The control valve does not operate until one of the springs 38 is compressed, and the tension of these springs determines the fluid pressure at which the piston 21 will be displaced. The tension of the springs may be adjusted as desired.

In order to turn the valve plug 14, a motor 40 of about one-sixth horsepower is operatively connected thereto by a crank shaft 41. The shaft carries a cam 42 to alternately close a pair of normally open starting switches $A_1$ and $B_1$ at opposite sides thereof.

Current is supplied to the grease pump motor 18 from the mill circuit which comprises three lines X, Y, Z, with a main hand switch 43 interposed. The wires pass through an automatic starter panel 44 where they are interrupted at 45. On the panel is also mounted a starter relay coil 46 which, when energized by the means presently to be described, closes the gaps 45 and completes the circuit to the motor 18. On the panel 44 are posts $c_1$ and $c_2$ to which the ends of the coil are joined by conductors 47 and 48 respectively, the latter leading also to the conductor Y. Two other posts 1 and 2 are mounted on the panel and joined by conductors 49 and 50 respectively to the conductor 47 (or corresponding end of coil 46) and to the conductor Z. The main control panel 51 supports an electric clock and time switch generally designated by the numeral 52 and operated by alternating current. This current is supplied from conductors 53 connected to a pair of posts $L_1$ and $L_2$ on the panel. In this line are interposed a relay switch 54 closed by current flowing in the mill circuit, a suitable transformer 55 and a safety fuse switch 56. The clock has four terminals 57, 58, 59, 60, and the posts $L_1$, $L_2$ are connected to the terminals 60 and 59, by lines $l_1$, $l_2$ respectively. The winding 61 of the clock motor is comprised in a conductor 62 which also has its ends connected to the terminals 59, 60. The time switch comprises contacts 63, 64 which are brought into engagement at regular intervals by the operation of the clock, and these contacts are joined to the terminals 58 and 57 by conductors 66 and 65 respectively.

An auxiliary relay AR is mounted on the panel and comprises a normally open pair of contacts 67 and a coil 68 having its ends joined to the terminals 57 and 60 by conductors 69 and 70 respectively. The terminals 58 and 59 are joined together by a short conductor 71. When the switch 63, 64 is closed, the relay AR closes by a current flowing from post $L_1$ along conductor $l_1$, terminal 60, conductor 70, relay coil 68, conductor 69, terminal 57, switch contacts 64, 63, to terminal 58, conductor 71 to terminal 59, and conductor $l_2$ to post $L_2$.

On the panel 51 is also mounted a motor relay MR having normally spaced contacts 72 joined respectively to the contacts 67 by conductors 73 and 74. The coil 75 of this relay has one end tapped into the conductor $l_1$ by a conductor 76 and its other end tapped into the conductor 74 by a conductor 77. A normally closed relay NCR is also mounted on the panel and has its contacts 78 joined respectively into the conductor 73 by a conductor 79 and to the post $L_2$ by a conductor 80.

When relay AR is closed, as previously described, the relay MR is energized and closed by a circuit as follows: From post $L_1$ along conductors $l_1$ and 76 to coil 75, conductors 77 and 74 to relay contacts 67, conductors 73 and 79 to normally closed contacts 78, and conductor 80 to post $L_2$. The panel further carries two more sets of posts $T_1$, $T_2$ and $C_1$ and $C_2$. The former are joined by conductors 81 and 82 to the motor 40 and the latter by conductors 83 and 84 to the posts $c_1$ $c_2$ respectively on the starter panel 44. A line 85 connects the post $T_1$ into the line 76, and another line 86 connects the post $T_2$ into the line 74.

The motor relay MR now being closed, closes a circuit through the motor 40 as follows: Post $L_1$, conductors $l_1$, 76 and 85, to post $T_1$, through motor 40 to post $T_2$, conductors 86 and 74 through contacts 72 of relay MR, conductors 73 and 79 to contacts 78 of relay NCR, and finally along conductor 80 to post $L_2$.

The relay AR opens with the opening of the timed switch 63, 64, and although the closing of relay MR depends initially on the closing of relay AR, relay MR having once closed maintains a circuit through its coil independently of relay AR as follows: From post $L_1$ along conductors $l_1$ and 76, through coil 75 of relay MR, conductors 77 and 74 to the relay contacts 72, conductors 73, 79 to the contacts 78 of the normally closed relay NCR and conductor 80 to post $L_2$.

A line 87 leads from the post 1 and is branched at 88 and 89 to a contact of each of the limit switches A and B at opposite sides of the control valve. From the post 2 extends a line 90 which is branched at 91 and 92 to a terminal of each of the normally open switches $A_1$ and $B_1$ at opposite sides of the cam 42. The remaining terminals of the switches A, $A_1$ are joined by a conductor 93, and in like manner the remaining terminals of the switches B, $B_1$ are joined by a conductor 94.

It will be recalled that the grease pump motor circuit is normally open until the starter relay 46 is energized, and up to this point the relay has not been energized. The motor 40, having been started as already described, continues to run until the cam 42 engages and closes one of the normally open switches $A_1$, $B_1$, for example the switch $B_1$ in this case. Either switch-closing position of the cam is accompanied by a setting of the four-way valve plug 14' to connect the pressure line 15 to one or the other of the feed lines 10 and 11. The closing of the switch $B_1$ energizes the relay coil 46 and closes the gaps 45 by a circuit as follows: conductor Y, through conductor 48 and coil 46 to conductor 49 and post 1, conductors 87 and 89 to switch B, conductor 94 to switch $B_1$, branch 92 and conductor 90 to post 2, and conductor 50 to line Z. On closing of the circuit X, Y, Z, the grease pump motor 18 and grease pump 17 are set in motion to deliver lubricant under pressure to the line 15 and the four-way valve.

On establishing a current path between the posts 1, 2, through the switches B, $B_1$ as just described, the coil 95 of the normally closed relay NCR is also energized. The ends of this coil are connected to the posts $C_1$, $C_2$ by conductors 96 and 97 respectively. The circuit is as follows: Conductors Y and 48 to post $c_2$, conductors 84 and 97 to coil 95, conductors 96 and 83 to post $c_1$, conductors 47 and 49 to post 1, post 1 to post 2 (through switches B, $B_1$ as previously described) and conductor 50 to line Z. With the opening of relay NCR by the energizing of its coil 95, the circuit to the motor 40 is opened, inasmuch as this circuit passes through the contacts 78 of relay NCR.

The grease pump 17 continues to operate, and when a predetermined pressure is developed, the rod 23 engages the finger 24 of switch B and opens this switch, thereby opening the circuit to the starter coil 46 but at the same time disengaging and closing the switch A for the next operation. With the opening of the starter coil circuit, the mill circuit XYZ is also opened, and the pump 17 stops. The opening of the switch B also opens the circuit to the coil 95 of relay NCR, so that this relay again closes.

The system is now idle but in readiness for another operation when the time switch 63, 64 is next closed. The various circuits are closed by the relays in the manner already described, except that switch A is substituted for switch B and the cam 42 ultimately closes switch $A_1$ and leaves switch $B_1$ open. Further, the four-way valve is adjusted by operation of the motor 40 to connect the pressure line 15 to the line 10 or 11 which was previously in communication with the return line 16. In this operation, on the attainment of a given pressure in the control valve, the switch A is opened and the grease pump stopped, the rods 22 and 23 being now returned, after two operations, to the starting position illustrated in Figure 1.

To summarize, the time clock switch 63—64 closes auxiliary relay AR. AR closes motor relay MR which maintains itself energized through an auxiliary circuit after AR opens. MR starts valve motor 40. Valve motor closes $A_1$ or $B_1$ and circuit is completed through A or B to close starter relay 46, 45 and start grease pump motor 18. The circuit through A, $A_1$ or B, $B_1$ opens the normally closed relay NCR and hence the circuit of valve motor 40. Pressure in control valve 20 opens A or B and breaks starter relay 46, 45 and grease pump motor (18) circuit. The parts are thus set for another cycle on the next closing of time clock switch 63, 64.

Figure 5:
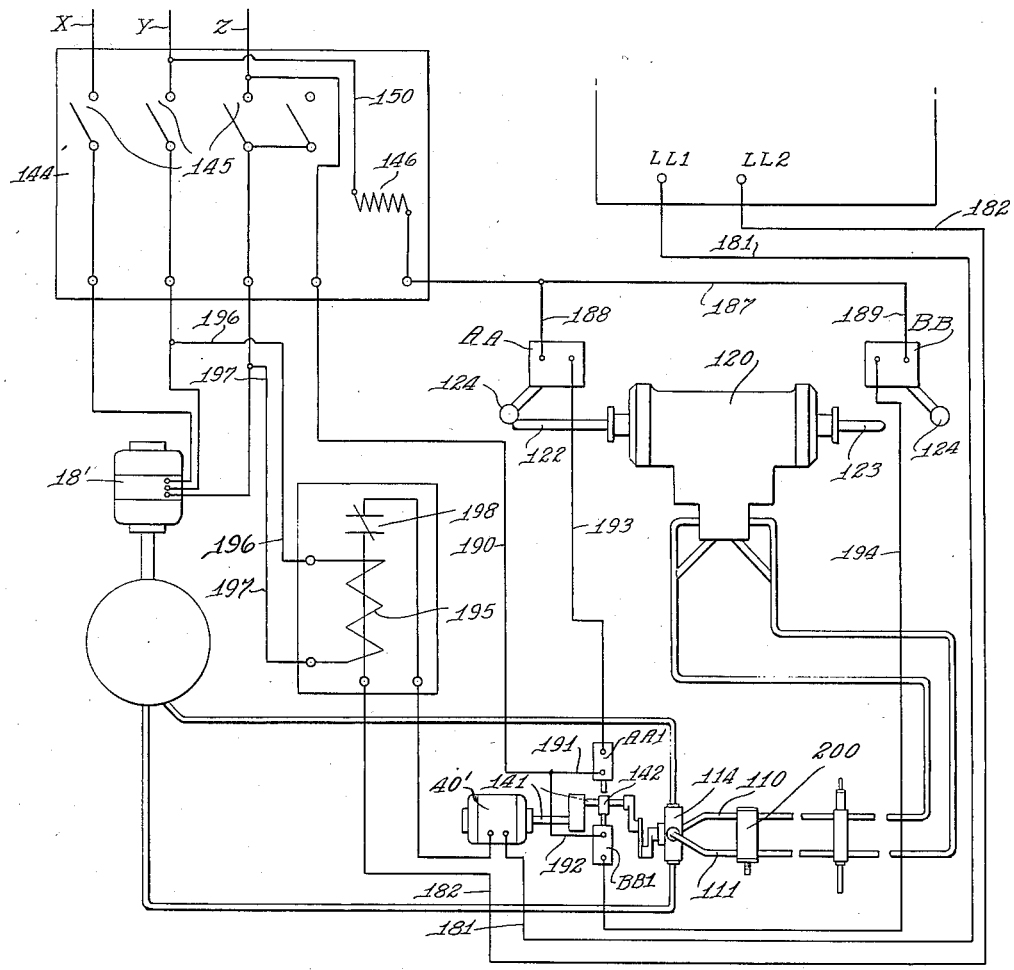
Fig. 5 is a wiring diagram of a modified construction.
Figure 6:
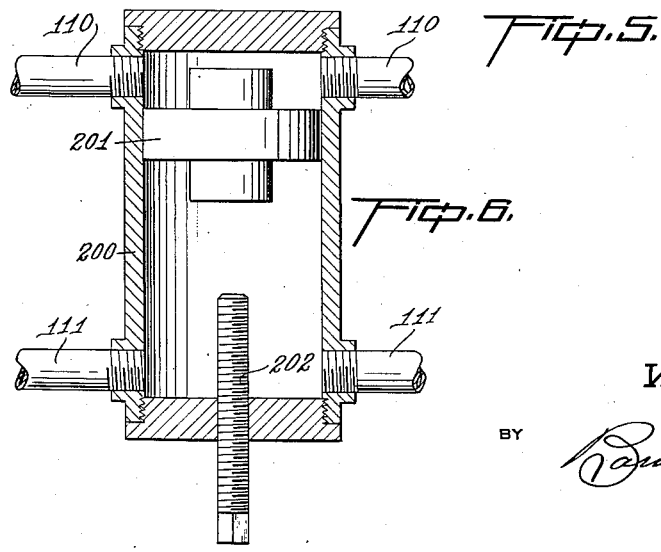
Fig. 6 is a sectional view of the adjustable accumulator.

In the modified system shown in Figure 5, the timed switch is eliminated, and the cycle of operation is regulated at an adjustable volume device. The main current lines XYZ pass through an automatic starter panel 144 which provides gaps 145 in the lines. The panel also carries a starter relay coil 146, which when energized by the means presently to be described, closes the gaps 145 in the lines XYZ and thereby starts the operation of the grease pump motor 18'.

The posts $LL^1$ and $LL^2$ correspond to the posts $L^1$, $L^2$ in Figure 1, it being understood that an alternating current is supplied to these posts through suitable control elements such as the relay 54, the transformer 55 and the safety switch 56 of Fig. 1. This circuit is employed for operating a valve motor 40' which corresponds to the valve motor 40 of Fig. 1. The conductors 181 and 182 leading to the motor contain the contacts 198 of a normally closed relay, the coil 195 of which is connected to the lines YZ by conductors 196 and 197. It will be evident, therefore, that the opening of the valve motor circuit is concurrent with flow of current in the lines YZ or on closing of the gaps 145 by energizing of the coil 146.

The valve motor 40' is adapted to set a four-way valve 114 to establish flow of lubricant from the grease pump selectively to the lines 110 and 111. The shaft 141 from the valve motor to the valve carries a cam 142 at opposite sides of which are positioned normally open switches $AA^1$ and $BB^1$. One terminal of each switch is branched as at 191 and 192 into a line 190 leading to the conductor Z ahead of the gap 145 therein. A conductor 150 leads from the conductor Y, ahead of the gap therein, to one end of the coil 146.

The lines 110 and 111 are connected into opposite ends of a control valve 120 which is similar in construction and operation to the valve 20 in Figure 1. It is preferred, although not necessary, to connect this valve into the ends of the lines in order that the pressure necessary to operate the control valve will be exerted in all the lubricating valves. At opposite sides of the control valve are mounted normally closed relays or switches AA and BB corresponding to the members A and B of Figure 1. One terminal of each of these switches is branched at 188 and 189 into a line 187 leading to the remaining end of the coil 146. The remaining terminals are joined respectively to the remaining terminals of the switches $AA^1$ and $BB^1$ by lines 193 and 194. Rods 122 and 123 extend from opposite ends of the control valve and are adapted respectively to open the normally closed switches AA and BB by engaging the movable elements 124 thereof.

Finally, the lines 110 and 111 are placed in fluid communication with opposite ends of an adjustable volume device which in the present instance is illustrated as an adjustable accumulator comprising a cylinder 200 with a piston 201 slidably mounted therein. The stroke of the piston is regulated by the adjustment of a screw 202. The stroke of the piston determines the time interval between operations of the control valve 120 as will presently appear.

In the operation of the device, let it be assumed that the normally closed switch AA is held open, as illustrated, at which time the cam 142 closes the normally open switch BB¹, leaving the switch AA¹ open. A circuit is thus completed through the relay coil 146 by way of the conductors 187 and 190 and the closed switches BB and BB¹. The gaps 145 are thereby closed, starting the grease pump motor 18' and supplying current to the coil 195 to open the normally closed relay contacts 198 and thereby stop the valve motor 40'.

When there is sufficient pressure developed in the fluid system to shift the valve 120, the switch BB is opened and the switch AA closed, and the relay 146 is de-energized, whereupon the gaps 145 are again opened. The normally closed relay 198, 195 is then permitted to close, and the valve motor 40' turns the cam 142 and reverses the four-way valve 114. In the movement of the cam 142, the switch AA¹ is closed, thus completing circuit to the coil 146 through the switches AA and AA¹. The grease pump motor 18' is thus started and the valve motor 40' stopped in the manner just described, until the next shifting of the control valve 120 opens the grease pump motor circuit and permits closing of the valve motor circuit to reverse the four-way valve 114 and close the switch BB¹.

It will be evident that the time intervals between reversals of the four-way valve or between operations of the grease pump motor 18', which are dependent on the development of a given pressure in the control valve 120, are also dependent on the volume of the fluid conducting system. The displacement of the piston 201 in the cylinder 200 is comprised in the volume of the fluid conducting system, and the displacement is adjustable by means of the screw 202. Thus, the time interval between operations of the system may be regulated by adjustment of the screw 202. It will be understood however that the adjustable accumulator 200, 202 is representative of any adjustable volume device inserted in the fluid conducting system, such as, for example, an adjustable displacement pump such as that disclosed in the co-pending application of C. R. Burrell, Serial No. 603,590, filed April 6, 1932, issued July 9, 1935 as Patent No. 2,007,156.

What I claim is:—

1. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, and means operable by said valve motor for stopping itself and starting said pump motor.

2. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, means operable by said valve motor for stopping itself and starting said pump motor, and a control valve connected to said lines and adapted to open the pump motor circuit.

3. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, means operable by said valve motor for stopping itself and starting said pump motor, and a pressure-operated control valve connected to said lines and adapted to open the pump motor circuit by a predetermined pressure in said lines.

4. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a switch operable by said valve motor for opening the valve motor circuit, said switch being also adapted to close the pump motor circuit when said valve motor stops.

5. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a switch operable by said valve motor for opening the valve motor circuit, said switch being also adapted to close the pump motor circuit when said valve motor stops, and a control valve connected to said lines and adapted to open said pump motor circuit.

6. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a switch operable by said valve motor for opening the pump motor circuit, said switch being also adapted to close the pump motor circuit when said valve motor stops, and a pressure-operated control valve connected to said lines and adapted to open said pump motor circuit by a predetermined pressure in said lines.

7. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a cam operated by said valve motor, normally open switches at opposite sides of said cam connected respectively in said pump motor circuit and adapted to be closed selectively when said valve has been moved to an open position, whereby to start said pump motor, and means whereby either of said switches opens said valve motor circuit when closed by said cam.

8. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a cam operated by said valve motor, normally open switches at opposite sides of said cam connected respectively in said pump motor circuit and adapted to be closed selectively when said valve has been moved to an open position, whereby to start said pump motor, means whereby either of said switches opens said valve motor circuit when closed by said cam, and a pressure-operated control valve connected to said lines and adapted to open said pump motor circuit by a predetermined pressure in said lines.

9. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a cam operated by said valve motor, normally open switches at opposite sides of said cam connected respectively in said pump motor circuit and adapted to be closed selectively when said valve has been moved to an open position, and a normally closed relay in the valve motor circuit, said switches being each adapted to open said pump motor circuit and stop the valve motor when closed by said cam.

10. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a cam operated by said valve motor, normally open switches at opposite sides of said cam connected respectively in said pump motor circuit and adapted to be closed selectively when said valve has been moved to an open position, a normally closed relay in the valve motor circuit, said switches being each adapted to open said pump motor circuit and stop the valve motor when closed by said cam, and a pressure-operated control valve connected to said lines and adapted to open said pump motor circuit by a predetermined pressure in said lines.

11. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a normally open starting relay in circuit with said pump motor, and means operable by said valve motor for stopping itself and closing said relay.

12. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a normally open starting relay in circuit with said pump motor, a normally closed relay in the circuit of said valve motor, and a switch operable by said valve motor for opening the last named relay to stop the motor, said switch being also connected to said starting relay to close the pump motor circuit when said valve motor stops.

13. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a normally open starting relay in circuit with said pump motor, a cam operated by said valve motor, normally open switches at opposite sides of said cam connected respectively to said starting relay and adapted to be closed selectively when said valve has been moved to an open position, whereby to start said pump motor, and means whereby either of said switches opens said valve motor circuit when closed by said cam.

14. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, means operable by said valve motor for stopping itself and closing the pump motor circuit, a pressure-operated control valve connected to said lines and having parts movable by pressure in said lines, and switches at said control valve engageable respectively by said parts and adapted each to open said pump motor circuit when engaged by said parts.

15. In a lubricating system, a pair of lines into which fluid under pressure is to be delivered alternately, a pump connected to said lines for supplying fluid thereto, a valve inserted between said pump and said lines for connecting said pump to said lines in alternation, a motor for operating said valve, means for starting motor activity, a pump motor for driving said pump, a cam operated by said valve motor, normally open switches at opposite sides of said cam connected respectively in the pump motor circuit and adapted to be closed selectively when said valve has been moved to an open position, whereby to start said pump motor, means whereby either of said switches opens said valve motor circuit when closed by said cam, a pressure operated control valve connected to said lines and having parts movable by pressure in said lines, and switches at said control valve engageable respectively by said parts and adapted each to open said starting relay when engaged by said parts.

16. In a lubricating system, a pair of lines into which fluid under pressure is to be delivered alternately, a plurality of measuring valves connected to said lines, a pump connected to said lines for supplying fluid thereto, a valve inserted between said pump and said lines for connecting said pump to said lines in alternation, a control valve connected to said lines and operable by a predetermined pressure in either one of said lines, means for reversing the first named valve on actuation of said control valve, and an adjustable volume device connected to said lines for regulating the time required for the development of the predetermined pressure in said lines.

17. In a lubricating system, a pressure actuated control valve in fluid communication with the system and operable by predetermined pressure therein, said valve being adapted to control means determining the direction of lubricant flow in the system, and an adjustable volume device connected into the system for regulating the time required for the development of said predetermined pressure.

18. In a lubricating system, a pair of feed lines into which fluid under pressure is to be delivered alternately, a plurality of measuring valves having dual inlets, one inlet of each valve being connected to one feed line while the other inlet of each valve is connected to the other of said feed lines, a pump connected to said lines for supplying fluid thereto, a valve inserted between said pump and said lines for connecting said pump to said lines in alternation, a control valve connected to said lines and operable by a predetermined pressure in either line, and means for reversing the first named valve on actuation of said control valve.

WILLIAM K. HAWKS.